(12) United States Patent
Haegermarck et al.

(10) Patent No.: US 10,534,367 B2
(45) Date of Patent: Jan. 14, 2020

(54) EXPERIENCE-BASED ROADMAP FOR A ROBOTIC CLEANING DEVICE

(71) Applicant: Aktiebolaget Electrolux, Stockholm (SE)

(72) Inventors: Anders Haegermarck, Trångsund (SE); Magnus Lindhé, Stockholm (SE)

(73) Assignee: Aktiebolaget Electrolux (SE)

( * ) Notice: Subject to any disclaimer, the term of this patent is extended or adjusted under 35 U.S.C. 154(b) by 241 days.

(21) Appl. No.: 15/535,244

(22) PCT Filed: Dec. 16, 2014

(86) PCT No.: PCT/EP2014/077947
§ 371 (c)(1),
(2) Date: Jun. 12, 2017

(87) PCT Pub. No.: WO2016/095965
PCT Pub. Date: Jun. 23, 2016

(65) Prior Publication Data
US 2019/0004537 A1    Jan. 3, 2019

(51) Int. Cl.
*G05D 1/02*  (2006.01)
*G01C 21/34* (2006.01)

(52) U.S. Cl.
CPC ......... *G05D 1/0274* (2013.01); *G01C 21/343* (2013.01); *G05D 1/0221* (2013.01); *G05D 2201/0203* (2013.01); *G05D 2201/0215* (2013.01)

(58) Field of Classification Search
CPC ............... G05D 1/0274; G05D 1/0221; G05D 2201/0203; G05D 2201/0215; G01C 21/343

USPC .......................................................... 701/25
See application file for complete search history.

(56) References Cited

U.S. PATENT DOCUMENTS

| 1,286,321 A | 12/1918 | Hoover |
| 1,401,007 A | 12/1921 | Staples |
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |

(Continued)

FOREIGN PATENT DOCUMENTS

| CA | 2154758 | 6/1995 |
| CN | 1116818 | 2/1996 |

(Continued)

OTHER PUBLICATIONS

International Search Report and Written Opinion for International Application No. PCT/EP2016/055547, dated Jan. 2, 2017, 10 pages.

(Continued)

*Primary Examiner* — Gertrude Arthur Jeanglaude
(74) *Attorney, Agent, or Firm* — RatnerPrestia

(57) ABSTRACT

A method of operating a robotic cleaning device over a surface to be cleaned. The method includes: registering roadmap nodes at intervals on the surface during cleaning, the roadmap nodes including positional information; and linking the roadmap nodes to form roadmap links in a roadmap graph, if the robotic cleaning device is driving directly from a previously registered roadmap node to a currently registered roadmap node. The roadmap links in the roadmap graph facilitate navigation of the robotic cleaning device.

16 Claims, 5 Drawing Sheets

(56) References Cited

U.S. PATENT DOCUMENTS

| | | |
|---|---|---|
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | FereydounMaali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | YuichiKawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,240,342 B1 | 5/2001 | Fiegert et al. |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |

(56) References Cited

U.S. PATENT DOCUMENTS

| | | |
|---|---|---|
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mod |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |

(56) References Cited

U.S. PATENT DOCUMENTS

| | | |
|---|---|---|
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi et al. |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |

(56) References Cited

U.S. PATENT DOCUMENTS

| | | |
|---|---|---|
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steitz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,780,342 B2 | 7/2014 | DiBernardo et al. |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,880,342 B2 | 11/2014 | Ando et al. |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | EnricoDiBernado |
| 9,436,185 B2 | 9/2016 | Schnittman |
| 9,687,132 B2 | 6/2017 | Schlischka |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |

(56) References Cited

U.S. PATENT DOCUMENTS

| | | |
|---|---|---|
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | MichaelAldred |
| 2005/0088643 A1 | 4/2005 | Anderson |
| 2005/0156562 A1 | 7/2005 | Cohen |
| 2005/0166354 A1 | 8/2005 | NaoyaUehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0020370 A1 | 1/2006 | Abramson |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song et al. |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | HirotoTanaka |
| 2006/0236492 A1 | 10/2006 | KazuyaSudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0250212 A1 | 10/2007 | Halloran et al. |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | ErwannLavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |

(56) References Cited

U.S. PATENT DOCUMENTS

| | | |
|---|---|---|
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon et al. |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138246 A1 | 5/2013 | Gutmann et al. |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |

(56) References Cited

U.S. PATENT DOCUMENTS

| | | |
|---|---|---|
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0317944 A1 | 11/2013 | Huang et al. |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0184144 A1 | 7/2014 | Henricksen et al. |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim |
| 2015/0039127 A1 | 2/2015 | Matsumoto |
| 2015/0057800 A1 | 2/2015 | Cohen |
| 2015/0120056 A1 | 4/2015 | Noh et al. |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0265122 A1 | 9/2015 | Han et al. |
| 2016/0202703 A1 | 7/2016 | Matsubara |
| 2016/0298970 A1 | 10/2016 | Lindhe et al. |
| 2016/0306359 A1 | 10/2016 | MagnusLindhe |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2017/0344013 A1 | 11/2017 | Haegermarck et al. |
| 2018/0103812 A1 | 4/2018 | Lee et al. |

FOREIGN PATENT DOCUMENTS

| | | |
|---|---|---|
| CN | 1668238 A | 9/2005 |
| CN | 1883889 A | 12/2006 |
| CN | 101161174 A | 4/2008 |
| CN | 101297267 A | 10/2008 |
| CN | 102083352 A | 6/2011 |
| CN | 102183959 A | 9/2011 |
| CN | 103027634 | 4/2013 |
| CN | 103054516 A | 4/2013 |
| CN | 103308050 A | 9/2013 |
| CN | 103376801 A | 10/2013 |
| CN | 103491838 A | 1/2014 |
| CN | 103534659 A | 1/2014 |
| CN | 103565373 A | 2/2014 |
| DE | 3536907 | 4/1986 |
| DE | 9307500 | 7/1993 |
| DE | 4211789 | 10/1993 |
| DE | 4340367 | 6/1995 |
| DE | 4439427 A1 | 5/1996 |
| DE | 19849978 | 5/2000 |
| DE | 202008017137 U1 | 3/2009 |
| DE | 102010000174 | 7/2011 |
| DE | 102010000573 | 9/2011 |
| DE | 102010037672 | 3/2012 |
| EP | 1447943 | 9/1976 |
| EP | 0142594 | 5/1985 |
| EP | 0358628 | 3/1990 |
| EP | 0474542 | 3/1992 |
| EP | 0584200 | 4/1993 |
| EP | 0569984 | 11/1993 |
| EP | 064133 | 1/1994 |
| EP | 0606173 | 7/1994 |
| EP | 075922 | 1/1995 |
| EP | 2355523 | 4/2001 |
| EP | 2382251 | 5/2003 |
| EP | 1099143 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 A2 | 6/2012 |
| EP | 2561787 | 2/2013 |
| EP | 2494446 | 3/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2999410 | 6/2014 |
| EP | 2772815 | 9/2014 |
| EP | 2884364 A1 | 6/2015 |
| EP | 2992803 A1 | 3/2016 |
| FR | 0584210 | 4/1993 |
| GB | 0759695 | 3/1995 |
| GB | 0944240 | 2/1997 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 A | 5/1988 |
| JP | 63181727 | 7/1988 |
| JP | 63241610 | 10/1988 |
| JP | 03162814 A | 7/1991 |
| JP | 03166074 | 7/1991 |
| JP | 04260905 | 9/1992 |
| JP | 05084200 | 4/1993 |
| JP | 05189041 | 7/1993 |
| JP | 05224745 | 9/1993 |
| JP | 05228090 | 9/1993 |
| JP | 0683442 A | 3/1994 |
| JP | 06125861 | 5/1994 |
| JP | 06144215 | 5/1994 |
| JP | 06179145 | 6/1994 |
| JP | 0732752 B2 | 4/1995 |
| JP | 07129239 A | 5/1995 |
| JP | 07281742 | 10/1995 |
| JP | 07287617 A | 10/1995 |
| JP | 08326025 | 12/1996 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002533797 A | 10/2002 |
| JP | 2002355204 | 12/2002 |

(56) References Cited

FOREIGN PATENT DOCUMENTS

| | | |
|---|---|---|
| JP | 2002366228 | 12/2002 |
| JP | 2003505127 A | 2/2003 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005050105 A | 2/2005 |
| JP | 2005124753 A | 5/2005 |
| JP | 2005141636 A | 6/2005 |
| JP | 2005314116 A | 11/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009500741 A | 1/2009 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2010534825 A | 11/2010 |
| JP | 2011045694 | 3/2011 |
| JP | 2011253361 A | 12/2011 |
| JP | 2012216051 A | 11/2012 |
| JP | 2013041506 A | 2/2013 |
| JP | 2013089256 A | 5/2013 |
| JP | 2013247986 A | 12/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 03026474 | 4/2003 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2014151501 A1 | 9/2014 |
| WO | 2015016580 | 2/2015 |

OTHER PUBLICATIONS

Notice of Allowance for U.S. Appl. No. 15/100,667, dated Aug. 6, 2018, 10 pages.
Non Final Office Action for U.S. Appl. No. 15/101,510, dated Jul. 27, 2018, 17 pages.
Non Final Office Action for U.S. Appl. No. 14/784,110, dated Aug. 16, 2018, 13 pages.
Chinese Office Action for Chinese Application No. 201380081537.9, dated Jun. 4, 2018 with translation, 15 pages.
Chinese Office Action for Chinese Application No. 201380075503.9, dated Nov. 8, 2017 with translation, 16 pages.
European Communication Pursuant to Article 94(3) for European Application No. 16176479.0, dated Nov. 27, 2017, 6 pages.
International Search Report and Written Opinion for International Application No. PCT/EP2015/070140, dated May 27, 2016, 11 pages.
European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
Final Office Action for U.S. Appl. No. 15/102,017, dated Jun. 14, 2018, 12 pages.
Non Final Office Action for U.S. Appl. No. 15/101,235, dated Jun. 14, 2018, 11 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notice of Reasons for Rejection for Japanese Application No. 2016-526947, dated Sep. 21, 2017 with translation, 8 pages.
Notice of Allowance for U.S. Appl. No. 15/102,015, dated Dec. 11, 2017, 8 pages.
Non Final Office Action for U.S. Appl. No. 15/101,515, dated Apr. 18, 2018, 14 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
Final Office Action for U.S. Appl. No. 15/100,667, dated Mar. 27, 2018, 22 pages.
Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
Extended European Search Report for European Application No. 18157403.9, dated Nov. 14, 2018, 12 pages.
Report of Reconsideration by Examiner before Appeal for Japanese Application No. 2016-526875, dated Oct. 24, 2018, 2 pages.
Final Office Action for U.S. Appl. No. 15/101,235, dated Jan. 11, 2019, 12 pages.
Notice of Allowance for U.S. Appl. No. 14/409,291, dated Sep. 18, 2017, 8 pages.

(56) References Cited

OTHER PUBLICATIONS

Notice of Reasons for Rejection for Japanese Application No. 2016-526764, dated Aug. 25, 2017 with translation, 6 pages.
Notification to Reasons for Rejection for Japanese Application No. 2016-526765, dated Aug. 25, 2017 with translation, 7 pages.
Notification of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Notice of Allowance for U.S. Appl. No. 14/784,106, dated Oct. 11, 2018 7 pages.
Non Final Office Action for U.S. Appl. No. 15/321,333, dated Oct. 24, 2018, 10 pages.
Position_ Definition of Position by Merriam-Webster.pdf (Position I Definition of Position by Merriam-Webster, Oct. 16, 2018, Merriam-Webster, https://www.merriam-webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Notification of Reasons for Refusal of Japanese Application No. 2016-568949, dated Oct. 1, 2018 with translation, 6 pages.
Non Final Office Action for U.S. Appl. No. 15/504,066, dated Nov. 5, 2018, 18 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 20130075510.9, dated Feb. 6, 2017 with translation, 14pages.
Chinese Office Action for Chinese Application No. 201380075503.9, dated Febraury 13, 2017 with translation, 18 pages.
Chung etal.,"Path Planning for a Mobile Robot With Grid Type World Model", Proceedings of the 1992 IEEE/RSJ International Conference on Intelligent Robots and Systems , Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory-Gainesville Florida, AAAI 1993 Fall Symposium Series—Research Triangle Park—Raleigh, NC, Oct. 22-24, 1993, pp. 1-6.
Everett, Sensors for Mobile Robots Theory and Application, A.K. Peters, 1995, Chapters 1 and 3, 70pages.
Everett, Sensors for Mobile Robots Theory and Application, A.K. Peters, Ltd., 1995, Chapters 15 and 16, 59pages.
Everett, Sensors for Mobile Robots Theory and Application, A.K. Peters, Ltd., 1995, Chapters 6, 7 and 10, 79pages.
Everett, Sensors for Mobile Robots Theory and Application, A.K. Peters, Ltd., 1995, Chapters, 4a nd 5, 68pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 14/409,291, dated Jun. 6, 2017, 21 pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for *International Application No. PCT/EP2015/058377, dated Aug. 10, 2016, 15 pages.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for Internatonal Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.

(56) References Cited

OTHER PUBLICATIONS

International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 12, 2014, 4 pages.
International Search Report for International Application No. PCT/EP2013/067500 dated Dec. 10, 2013, 4pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana, CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Non Final Office Action for U.S. Appl. No. 15/102,015, dated Aug. 17, 2017, 13 pages.
Notice of Allowance for U.S. Appl. No. 14/409,291, dated Jun. 16, 2016, 13 pages.
Notice of Allowance for U.S. Appl. No. 15/101,257, dated Jul. 6, 2017, 9 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 9525, Cover page+pp. 1-14.
Written Opinion for International Application No. PCT/EP2013/067500 dated Dec. 10, 2013, 7pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124+Figure 9 and Figure 11.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
Non Final Office Action for U.S. Appl. No. 15/535,506, dated May 1, 2019, 16 pages.
Yoshida et al., "Online Motion Planning Using Path Deformation and Replanning", 28th Annual Robot Society, 2011, vol. 29, No. 8, Chapter 3, pp. 716-725 with partial translation, 10 pages.
Japanese Notice of Reasons for Refusal for Japanese Application No. 2017-522557, dated Jun. 18, 2019, 6 pages.
International Search Report and Written Opinion of the International Searching Authority for International Application No. PCT/E2016/072291, dated Jun. 6, 2017, 11 pages.
Non Final Office Action for U.S. Appl. No. 15/102,017, dated Jan. 22, 2019, 15 pages.
Final Office Action for U.S. Appl. No. 15/101,510, dated Feb. 8, 2019, 16 pages.
Final Office Action for U.S. Appl. No. 15/535,506, dated Sep. 17, 2019, 11 pages.
Chinese Office Actio for Chinese Application No. 201480084065.7, dated Sep. 16, 2019 with translation, 16 pages.

EXPERIENCE-BASED ROADMAP FOR A ROBOTIC CLEANING DEVICE

This application is a U.S. National Phase application of PCT International Application No. PCT/EP2014/077947, filed Dec. 16, 2014, which is incorporated by reference herein.

TECHNICAL FIELD

The invention relates to a robotic cleaning device and to a method of operating and navigating the robotic cleaning device by registering roadmap nodes when driving.

BACKGROUND

In many fields of technology, it is desirable to use robots with an autonomous behaviour such that they can freely move around a space without colliding with possible obstacles.

Robotic vacuum cleaners or robotic floor mops, further referred to as robotic cleaning devices, are known in the art and usually equipped with drive means in the form of one or more motors for moving the cleaner across a surface to be cleaned. The robotic cleaning devices may further be equipped with intelligence in the form of microprocessor(s) and navigation means for causing an autonomous behaviour such that the robotic vacuum cleaners can freely move around and clean a space in the form of e.g. a room. Thus, these prior art robotic cleaning devices have the capability of more or less autonomously vacuum clean or mop a room, in which furniture such as tables, chairs and other obstacles such as walls and stairs are located.

There are basically two categories of robotic cleaning devices known in the prior art; —the ones which clean a surface by random motion and the ones which navigate using various sensor data.

The robotic cleaning devices, which use a random motion also look randomly for the charger. These robotic cleaning devices navigate and clean by principle of contingency. Such robotic cleaning devices may comprise a collision sensor to avoid collisions when cleaning. Typically they have means to detect and locate the charger when they happen to pass it or when the charger comes into the field of view. This is obviously not a very efficient way of cleaning and navigating and may in particular not work very well for large surfaces or for complicated layouts.

The other type of prior art robotic cleaning devices, which navigate using sensor data deduced from the sensor data where they can safely drive without collisions with obstacles. As they make assumptions about their environment based on the sensor data, which is in most cases not complete, they run a high risk of getting stuck or lost. In addition, extracting data and thus making assumptions from the sensor data additionally requires expensive electronic components.

In some cases prior art robotic cleaning devices use a stroke method to clean, which means they drive back and forth stroke by stroke in order to clean a surface. When navigating such a prior robotic cleaning device from one room to another or back to the charger, the robotic cleaning device uses sensor data to navigate. The risk of colliding with obstacles is then comparably high, since such robotic cleaning devices are also forced to make assumptions based on the sensor data. This may slow down the robotic cleaning device and thus reduce the efficiency of the cleaning.

In other cases the robotic cleaning device may even get stuck without any battery power left because the distances it has to drive are too far and not properly planned.

SUMMARY

An object of the present invention is to provide a method of operating a robotic cleaning device that is robust and efficient.

It is advantageous to provide a robotic cleaning device comprising a processing unit or the like that is configured to perform the method in order to operate the robotic cleaning device accordingly.

The inventors have realized that it is possible to take advantage of the fact that a robotic cleaning device is moving eventually across an entire surface to be cleaned. Because the robotic cleaning device is eventually covering the entire surface and this many times during its operating life, it is possible to provide a robust and surprisingly efficient method to enhance the safety and efficiency of the navigation and cleaning performed by the robotic cleaning device.

Disclosed herein is a method of operating a robotic cleaning device over a surface to be cleaned comprising the steps of:

registering roadmap nodes at intervals on the surface during cleaning, said roadmap nodes comprising positional information;

linking the roadmap nodes to form roadmap links in a roadmap graph, if the robotic cleaning device is driving directly from a previously registered roadmap node to a currently registered roadmap node, whereby the roadmap links in the roadmap graph may facilitate navigation of the robotic cleaning device.

The roadmap links may form a sequence, whereby this sequence may be continuous or not. Such a sequence forms a path, which the robotic cleaning device can reuse and follow at a later stage, for example to transport itself from one point to another or for navigating from an arbitrary position back to the charger.

The above described method takes advantages of the fact that the robotic cleaning device is navigating over the entire surface to be cleaned. Eventually the surface is virtually covered with roadmap nodes that are linked together. The robotic cleaning device thus knows exactly where it can safely drive without colliding with an obstacle. In other words, because the robotic cleaning device continuously registers roadmap nodes there will always be a possibility for the robotic cleaning device to find an obstacle-free path or sequence from its current position to any position where it has been before.

The roadmap nodes may be virtual roadmap nodes, registered in the memory of the robotic cleaning device.

In the above, the term driving directly form a previously registered roadmap node to a currently registered roadmap node means that the robotic cleaning device is driving without colliding or detecting an obstacle in between the previously registered roadmap node and the currently registered roadmap node.

In case an obstacle is detected in between two roadmap nodes the robotic cleaning device will navigate around it and continue to register roadmap nodes while doing that.

According to a preferred embodiment the method may comprise the step of adding a shortcut link between a previously registered roadmap node of a first sequence, and a currently registered roadmap node of a second sequence of registered roadmap nodes, if the two roadmap nodes are found to be close enough so that it can be safely assumed that the robotic cleaning device can drive in between them without risking any collision.

The safe assumption may for example be considered, if no obstacle is detected in between the previously registered roadmap node of the first sequence and the currently registered roadmap node of the second sequence, said second sequence being arranged at an offset from the first sequence.

The shortcut links increase the robustness of the navigation. The robotic cleaning device is capable of driving and navigating between sequence sections by using the shortcut links. The shortcut links may shorten transportation paths quite substantially, as disclosed later herein.

The criterion for adding a shortcut in between the previously registered roadmap node of the first sequence and the currently registered roadmap node of the second sequence may be that the offset is smaller than a width of the robotic cleaning device.

Generally the offset may be chosen to be less than one of the dimensions of the robotic cleaning device, for example the width or length of the robotic cleaning device.

This may help the robotic cleaning device to ensure that there is no obstacle in between the registered roadmap node of the first sequence section and the currently registered roadmap node of the second sequence section.

The first sequence section and the second sequence section may each comprise at least two roadmap nodes linked by a roadmap link.

In an embodiment the method may further comprise the step of determining a shortest distance between a first position, preferably within the roadmap graph, and a second position, preferably within the roadmap graph, by identifying the registered roadmap node in proximity to the first position and the registered roadmap node in proximity to the second position and then calculating a transportation sequence, which comprises the smallest amount of linked registered roadmap nodes that lead from the first position to the second position.

Alternatively to the above the robotic cleaning device may be configured to measure the geometrical length of each link, thus roadmap link and shortcut link, and choose a path or sequence that has the shortest total distance, said total distance being the sum of the geometrical lengths of all links involved in the path or sequence. This may provide even shorter sequences.

The transportation sequence may comprise roadmap links and shortcut links.

The smallest amount of linked roadmap nodes points generally to the shortest distance from the first position to the second position. The transportation sequence uses the roadmap links and shortcut links that are established and thus avoids a collision with an obstacle.

In an embodiment the intervals may be time intervals.

The time intervals may be in the range of 1 to 30 seconds, preferably 3 to 20 seconds and more preferably from 5 to 15 seconds.

The robotic cleaning device may be configured to only register roadmap nodes while moving on the surface to be cleaned.

In another embodiment the intervals, between registered roadmap nodes, may be distance intervals.

The distance intervals may be in the range of 1 to 20 cm, preferably 5 to 15 cm and more preferably in the range of 7 to 13 cm.

Alternatively the distance intervals may be in the range of 1% to 100% of the largest dimension of the robotic cleaning device, more preferably 20% to 50% of the largest dimension of the robotic cleaning device.

The distance intervals may be measured by a location-sensor connected to a processing unit.

Advantageously the intervals may be shortened if it is detected that the robotic cleaning device is changing its direction of movement more than a predefined upper threshold value.

This may increase accuracy when the robotic cleaning device is navigating in complex areas, said areas having for example many obstacles or a complicated layout.

The upper threshold value may for example be measured as amount of direction changes of the robotic cleaning device per time or amount of direction changes of the robotic cleaning device per distance.

In another embodiment the intervals may be extended if it is detected that the robotic cleaning device is changing its direction of movement less than a predefined lower threshold value.

This may reduce the amount of roadmap nodes and thus data that is produced.

The lower threshold value may for example also be measured as amount of direction changes of the robotic cleaning device per time or amount of direction changes of the robotic cleaning device per distance.

In another embodiment the method may further comprise a step of adding straight shortcut links between straightly linked roadmap nodes by connecting a first roadmap node and a last roadmap node of a straight sequence segment.

The straight shortcut links may simplify the roadmap graph.

It may be advantageous not to delete the originally registered roadmap nodes arranged in between the first roadmap node and the last roadmap node of the straightly linked roadmap nodes since the roadmap nodes arranged in between may be needed for the shortcut links between a first sequence section and a second sequence section.

The straight shortcut links may be advantageous when the robotic cleaning device navigates through long narrow corridors or the like.

In another embodiment the roadmap nodes may comprise additional information about the status of the robotic cleaning device at the time of registering the roadmap node and/or the roadmap link.

The additional information may be used to select, among multiple possible roadmap nodes, an arbitrary sequence of roadmap nodes that reduces the risk for collision with an obstacle.

The additional information may for example comprise tags such as "carpet edge", "wall", "door sill" if such objects or obstacles are encountered, in order to improve the safety of the navigation.

Herein is also disclosed a robotic cleaning device comprising a main body, a propulsion system arranged to move the robotic cleaning device, a contact detecting portion connected to the main body and arranged to detect if the robotic cleaning device is in contact with an object and a dead reckoning sensor operatively connected to the propulsion system. The robotic cleaning device may further comprise a processing unit arranged to control the propulsion system, whereby the processing unit may be connected to the dead reckoning sensor and configured to perform the method comprising any of the previously described steps and/or features.

Disclosed herein is further a computer program comprising computer-executable instructions for causing a robotic cleaning device to perform the method comprising any of the previously described steps and/or features, when the computer-executable instructions are executed on a processing unit included in the robotic cleaning device.

Disclosed is further a computer program product comprising a computer readable storage medium, the computer readable storage medium having the computer program according to the above embodied therein.

Generally, all terms used in the claims are to be interpreted according to their ordinary meaning in the technical field, unless explicitly defined otherwise herein. All references to "a/an/the element, apparatus, component, means, device, step, etc." are to be interpreted openly as referring to at least one instance of the element, apparatus, component, means, device, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device 10 according to the invention can be mains-operated and have a cord, be battery-operated or use any other kind of suitable energy source, for example solar energy.

Figure 1:
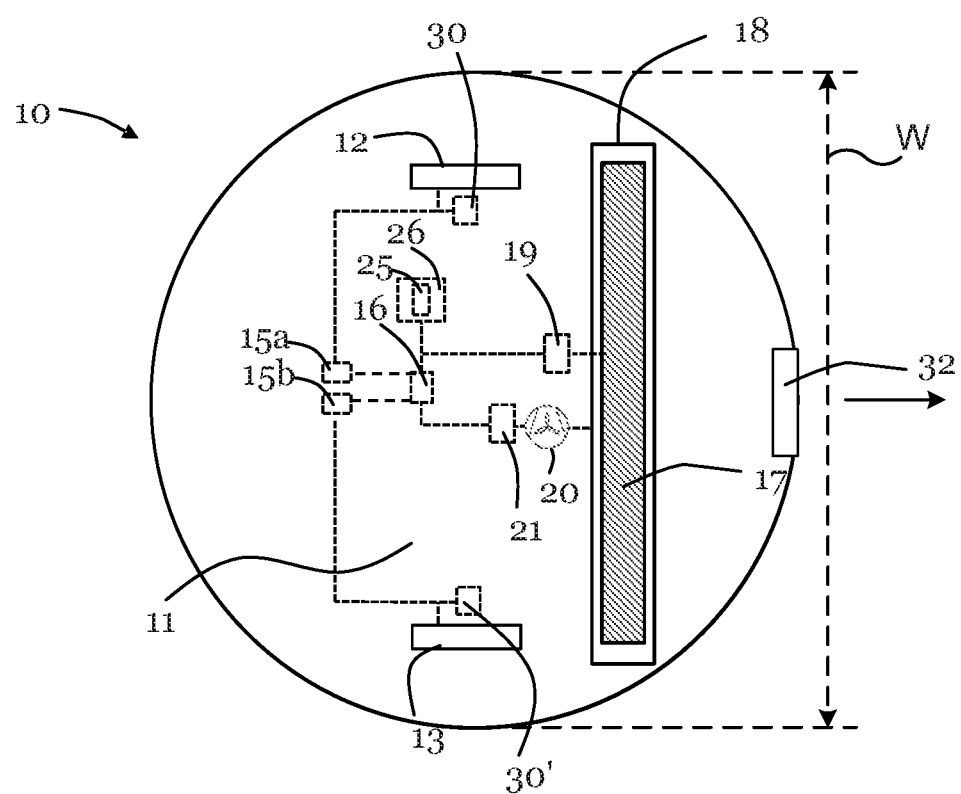
FIG. 1 schematically illustrates a top down view onto an embodiment of a robotic cleaning device according to the invention.

FIG. 1 shows a robotic cleaning device 10 according to an embodiment of the present invention in a bottom view, i.e. the bottom side of the robotic cleaning device 10 is shown. The arrow indicates the forward direction of the robotic cleaning device. The robotic cleaning device 10 comprises a main body 11 housing components such as a propulsion system comprising driving means in the form of two electric wheel motors 15a, 15b for enabling movement of the driving wheels 12, 13, such that the robotic cleaning device 10 can be moved over a surface to be cleaned. Each wheel motor 15a, 15b is capable of controlling the respective driving wheel 12, 13 to rotate independently of each other in order to move the robotic cleaning device 10 across a surface to be cleaned. A number of different driving wheel arrangements, as well as various wheel motor arrangements, may be envisaged. It should be noted that the robotic cleaning device 10 may have any appropriate shape, such circular-shaped main body 11 as illustrated, or a triangular-shaped main body.

As an alternative to the above described propulsion system, a track propulsion system may be used or even a hovercraft propulsion system.

The propulsion system is further connected to two dead reckoning sensors 30, 30', one assigned to each driving wheel 12, 13, as illustrated in FIG. 1. The dead reckoning sensors 30, 30' are configured to independently measure distances traveled by the robotic cleaning device 10 by observing the movement and turns, respectively, of the driving wheels 12, 13, in order to help to position the robotic cleaning device 10, for example within a room.

The embodiment of the robotic cleaning device 10 as illustrated in FIG. 1 comprises two dead reckoning sensors 30, 30', it is however possible to envisage robotic cleaning devices comprising only one dead reckoning sensor 30, 30'.

A controller such as processing unit 16 controls the wheel motors 15a, 15b to rotate the driving wheels 12, 13 as required in view of information received from an obstacle detecting device (shown in FIG. 2) for detecting obstacles in the form of walls, floor lamps, table legs, around which the robotic cleaning device must navigate. The dead reckoning sensors 30, 30' are connected to the processing unit 16, for example via the electric wheel motors 15a, 15b, as illustrated in FIG. 1.

The obstacle detecting device may be embodied in the form of infrared (IR) sensors and/or sonar sensors, a microwave radar, a 3D sensor system registering its surroundings, implemented by means of e.g. a 3D camera, a camera in combination with lasers, a laser scanner, etc. for detecting obstacles and communicating information about any detected obstacle to the processing unit 16. The processing unit 16 communicates with the wheel motors 15a, 15b to control movement of the wheels 12, 13 in accordance with information provided by the obstacle detecting device.

In FIG. 1 the width W of the robotic cleaning device 10 is further illustrated. As the main body 11 has a round shape, the width W corresponds to a diameter of the main body. In general terms the width W may be defined as the widest part or largest dimension of the robotic cleaning device 10 as measured in a forward direction M.

The main body 11 may optionally be provided with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is operatively coupled to the brush roll to control its rotation in line with instructions received from the processing unit 16.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 connected to the processing unit 16 from which the fan motor 21 receives instructions for controlling the suction fan 20. It should be noted that a robotic cleaning device 10 having either one of the rotatable brush roll 17 and the suction fan 20 for transporting debris to the dust bag may be envisaged. A combination of the two will however enhance the debris-removing capabilities of the robotic cleaning device 10.

Alternatively, the robotic cleaning device 10 may comprise a mop (not shown) and/or a rotating floor brush (not shown).

With further reference to FIG. 1, the processing unit 16 may be embodied in the form of one or more microprocessors arranged to execute a computer program 25 downloaded to a suitable storage medium 26 associated with the microprocessor, such as a Random Access Memory (RAM), a Flash memory or a hard disk drive. The processing unit 16 is arranged to carry out a method according to embodiments of the present invention when the appropriate computer program 25 comprising computer-executable instructions is downloaded to the storage medium 26 and executed by the processing unit 16. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a network. The processing unit 16 may alternatively be embodied in the form of a digital signal processor (DSP), an application specific integrated circuit (ASIC), a field-programmable gate array (FPGA), a complex programmable logic device (CPLD), etc.

In FIG. 1 is further a contact detecting portion 32 illustrated. The contact detecting portion 32 is arranged at a front end of the robotic cleaning device 10 as seen in a direction of movement. The contact detecting portion 32 may extend over the whole front part of the robotic cleaning device 10, similar to a park distance sensor of a modern car. Alternatively, the contact detecting portion 32 may only extend over the front extremity of the robotic cleaning device 10, as illustrated in FIG. 1. The contact detecting portion 32 is arranged in order to detect whether or not the robotic cleaning device 10 is in contact with an object or landmark. This may be useful when a collision with obstacles has to be avoided.

Figure 2:
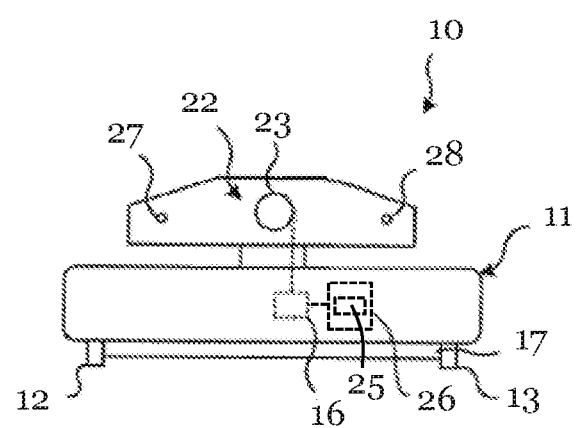
FIG. 2 schematically illustrates a front view onto a robotic cleaning device according to an embodiment of the invention.

FIG. 2 shows a front view of the robotic cleaning device 10 according to an embodiment illustrating the previously mentioned obstacle detecting device in the form of a 3D camera system 22 comprising at least a camera 23 and a first and a second structured light source 27, 28, which may be horizontally or vertically oriented line lasers. Further illustrated is the processing unit 16, the main body 11, the driving wheels 12, 13, and the rotatable brush roll 17 previously discussed with reference to FIG. 1. The processing unit 16 is operatively coupled to the camera 23 for recording images of a vicinity of the robotic cleaning device 10. The first and second structured light sources 27, 28 may preferably be vertical line lasers and are arranged lateral of the camera 23 configured to illuminate a height and a width that is greater than the height and width of the robotic cleaning device 10. The camera 23 is controlled by the processing unit 16 to capture and record a plurality of images per second. Data from the images is extracted by the processing unit 16 and the data is typically saved in the storage medium 26 along with the computer program 25.

The first and second structured light sources 27, 28 are configured to scan, preferably in a vertical orientation, the vicinity of the robotic cleaning device 10, normally in the direction of movement of the robotic cleaning device 10. The first and second structured light sources 27, 28 are configured to send out laser beams, which illuminate furniture, walls and other obstacles of a home or room. The camera 23 is controlled by the processing unit 16 to capture and record images from which the processing unit 16 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the processing unit 16 may derive positional data of the robotic cleaning device 10 with respect to the surface to be cleaned from the recorded images, to generate a 3D representation of the surroundings in particular the obstacles.

The 3D representation generated from the images recorded by the 3D camera system 22 thus facilitates detection of obstacles in the form of walls, floor lamps, table legs, etc. around which the robotic cleaning device 10 must navigate as well as rugs, carpets, doorsteps, etc., that the robotic cleaning device 10 must traverse.

With respect to FIG. 2, for illustrational purposes, the 3D camera system 22 is separated from the main body 11 of the robotic cleaning device 10. However, in a practical implementation, the 3D camera system 22 is likely to be integrated with the main body 11 of the robotic cleaning device 10 to minimize the height of the robotic cleaning device 10, thereby allowing it to pass under obstacles, such as e.g. a sofa.

The robotic cleaning device 10 has now been described comprising an obstacle detecting device having a 3D camera 23 and first and second structured light sources 27, 28, as this provides for an efficient and rather quick navigation of the robotic cleaning device. However, in its simplest form the robotic cleaning device 10 may only comprise the contact detecting portion 32, since this contact detecting portion 32 enables the robotic cleaning device 10 to navigate around detected obstacles. For the method as illustrated herein, it is sufficient that the robotic cleaning device 10 comprises the contact detecting portion 32, the obstacle detecting device is not essential to perform the method described herein.

Figure 3:
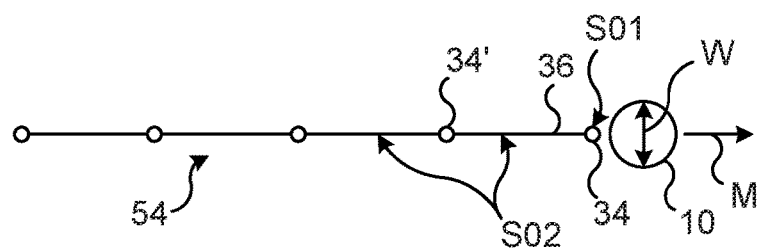
FIG. 3 schematically illustrates the steps of registering roadmap nodes and forming roadmap links according to a method of the invention.
Figure 4:
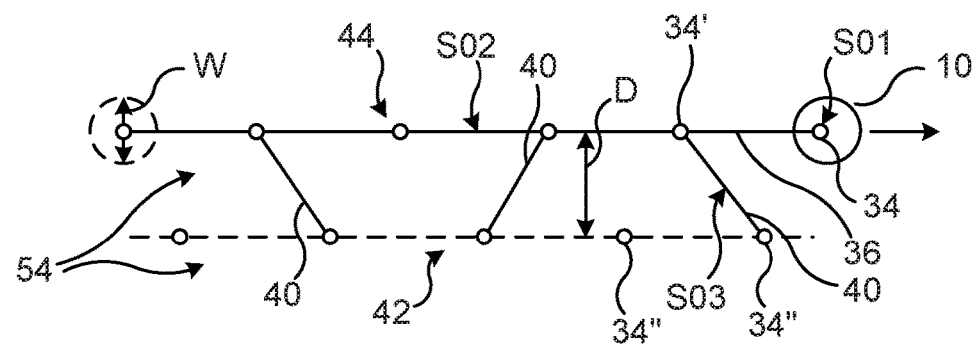
FIG. 4 schematically illustrates the step of adding shortcuts in between roadmap nodes.
Figure 5:
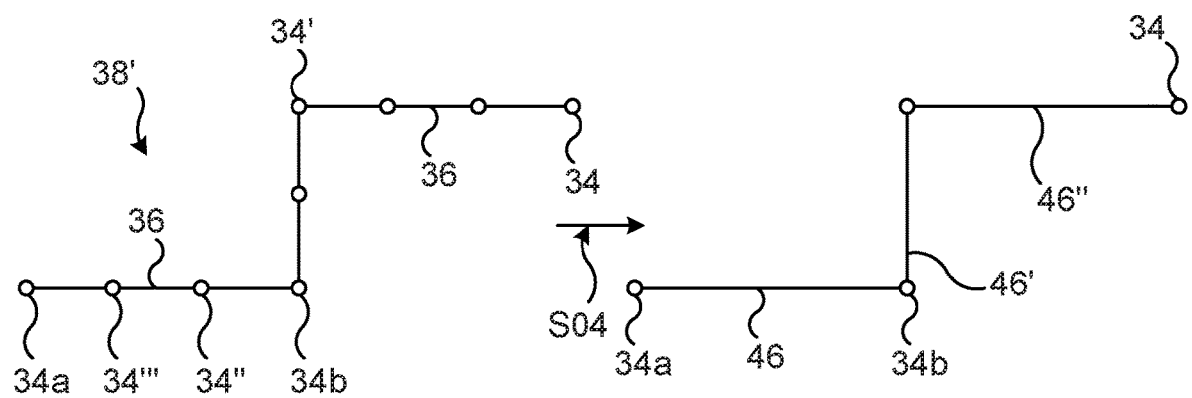
FIG. 5 schematically illustrates the step of adding straight shortcuts in between straightly connected roadmap nodes.
Figure 6:
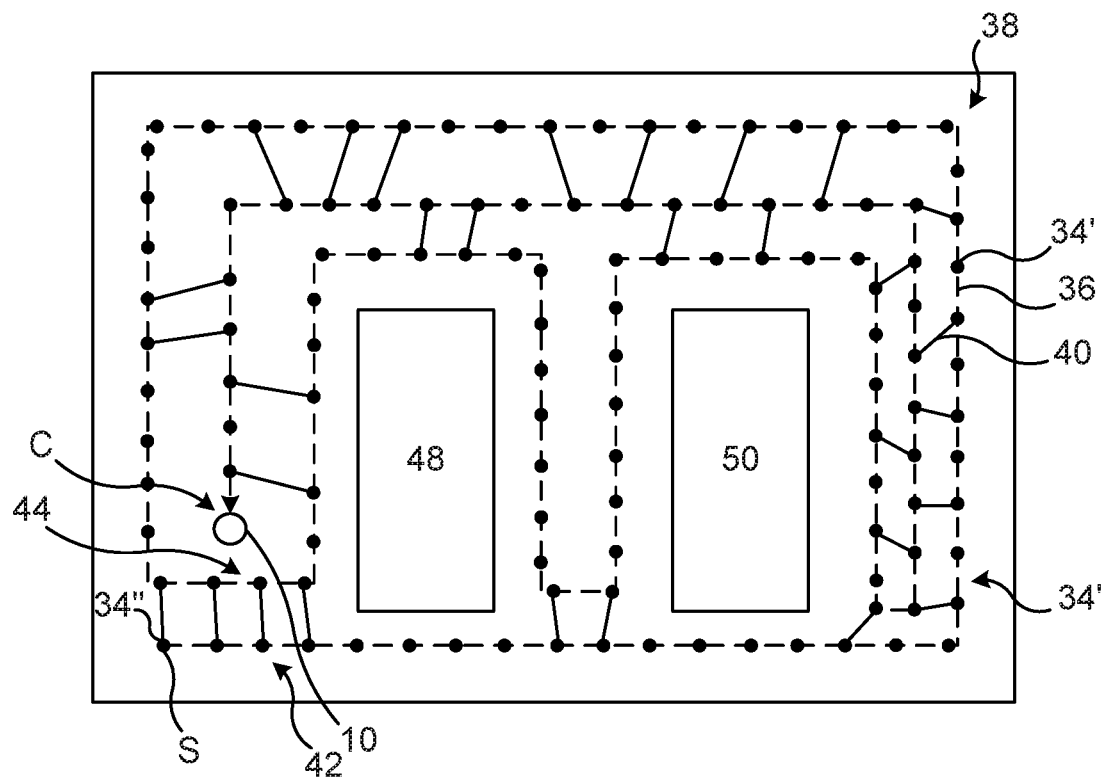
FIG. 6 schematically illustrates a roadmap graph of cleaning environment after the completion of a cleaning by the robotic cleaning device.
Figure 7:
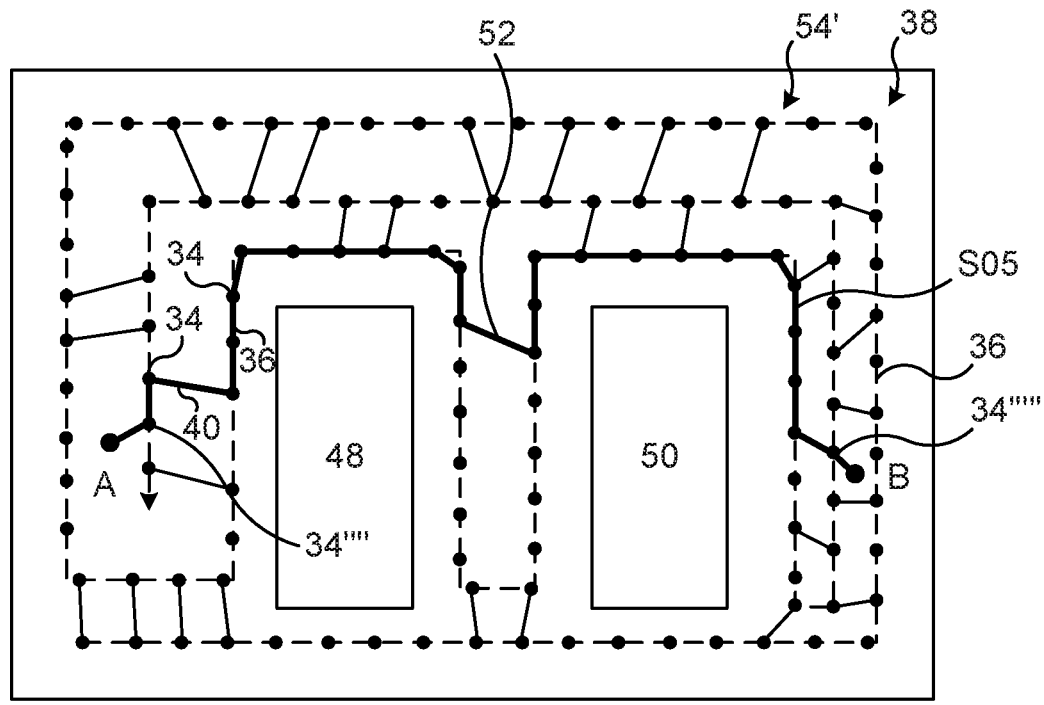
FIG. 7 schematically illustrates the step of determining and calculating a shortest distance between a first position and a second position in the roadmap graph of FIG. 6.

FIGS. 3 to 5 illustrate steps of the method according to the present invention. In the following the terms roadmap node 34, roadmap link 36 and roadmap graph 38 (c.f. FIGS. 6 and 7) relate to the following:

Roadmap node 34: a position of the robotic cleaning device 10 at a specific point in time whereby the roadmap node is a virtual point, for example stored on the storage medium 26, said virtual point eventually building a roadmap graph;

Roadmap link 36: a record, which also may be stored on the storage medium 26, that connects two or more roadmap nodes 34, 34', 34" in between which the robotic cleaning device could drive directly without colliding with any obstacles;

Roadmap graph 38: a virtual map, for example stored on the storage medium 26, of the surface to be cleaned comprising at least some of the roadmap nodes 34 and the roadmap links 36.

The roadmap graph 38 may comprise additional features as will be described later herein.

FIG. 3 illustrates how the robotic cleaning device 10 moves in a direction M while registering S01 roadmap nodes 34, 34' at intervals. When it is detected that the robotic cleaning device 10 could directly drive or move from a previously registered roadmap node 34' to a currently registered roadmap node 34 the two roadmap nodes 34', 34 are linked S02 by a roadmap link 36. As illustrated in FIG. 3, the robotic cleaning device 10 has been driving straight for a sequence of five roadmap nodes 34, 34' without colliding with any obstacle and thus these roadmap nodes 34', 34 are all linked together by roadmap links 36. This indicates to the robotic cleaning device 10 that it is safe to drive along these roadmap links 36 and that his may be done again if necessary for example for transportation (c.f. FIG. 7).

The linked roadmap nodes 34, 34' may form a sequence 54. This sequence 54 is continuously extended as the robotic cleaning device 10 is driving and cleaning, as for example illustrated in FIGS. 6 and 7. It should however be noted that the sequence 54 does not have to be continuous it may be interrupted.

The intervals between the registered roadmap nodes 34, 34' may be time intervals or distance intervals. Thus the roadmap nodes 34, 34' may be dropped or registered at time intervals of for example 1 to 30 seconds, preferably 3 to 20 seconds and more preferably from 5 to 15 seconds or at distance intervals of for example 1 to 20 cm, preferably 5 to 15 cm and more preferably in the range of 7 to 13 cm.

Alternatively the distance intervals may be in the range of 1% to 100% of the largest dimension of the robotic cleaning device 10, more preferably 20% to 50% of the largest dimension of the robotic cleaning device 10, which is in the illustrated case the diameter or width W but may in other cases be a length or width of the robotic cleaning device.

FIG. 4 illustrates additionally to the steps illustrated together with FIG. 3, how the robotic cleaning device 10 is adding S03 a shortcut link 40 between a registered roadmap node 34" of a first sequence section 42 or first sequence of a sequence 54 of registered roadmap nodes and a currently registered roadmap node 34 of a second sequence section 44 or second sequence of the sequence 54 of registered roadmap nodes, if no obstacle is detected in between the registered roadmap node of the first sequence section 42 and the currently registered roadmap node 34 of the second sequence section 44. As shown in FIG. 4, the second sequence section 44 is arranged at an offset D from the first sequence section 42.

The first sequence section 42 is illustrated as a dashed line in FIG. 4 for illustrative purposes in order to easier distinguish between the two sequence sections 42, 44. Additionally, the robotic cleaning device 10 is illustrated in a dashed shape to show that it drove along the second sequence section 44 while adding the illustrated shortcut links 40. The robotic cleaning device is further shown transparent in order to illustrate the registering S01 of the current roadmap node 34.

The robotic cleaning device 10 is thus configured to follow previously registered roadmap nodes 34" as soon as the processing unit 16 detects that previously registered roadmap nodes 34" are encountered, which is usually the case as for example illustrated in FIGS. 6 and 7. In other words, the robotic cleaning device 10 is capable of noticing where it has been before, since it will detect and thus recognize these areas because of the previously registered roadmap nodes 34', 34".

The shortcut links 40 thus connect the at least approximately parallel first sequence section 42 and second sequence section 44 if no obstacle is detected. Shortcut links 40 may be added continuously whenever possible or only sequentially at defined distance or time intervals.

The offset D between the second sequence section 44 and the first sequence section 42 must be smaller than the width W (c.f. FIG. 1) of the robotic cleaning device 10, only then is safe to assume that no obstacle is arranged in between the currently registered roadmap node 34 of the second sequence section 44 and the previously registered roadmap node 34" of the first sequence section 42. The offset D may further be chosen to be less than a width (not illustrated in the figures) of the opening 18 of the suction fan 20. The processing unit 16 may be configured to navigate the robotic cleaning device 10 accordingly at an offset D less than the width W of the robotic cleaning device 10, when previously registered roadmap nodes 34" are encountered.

FIG. 5 illustrates how straight shortcut links 46, 46', 46" may be added S04 between straightly linked roadmap nodes 34''', 34a, 34b forming a straight sequence section 43. When the processing unit 16 detects that the robotic cleaning device 10 was driving at least approximately straight for sequence of roadmap nodes 34a, 34''', 34b it may add S04 straight shortcut links 46, 46', 46" between a first roadmap node 34a and a last roadmap node 34b of a straight sequence of roadmap nodes 34a, 34b, 34'''. In order to add shortcut links 40 (c.f. FIG. 4) later on, thus when following (not shown in the figures) the sequence of roadmap nodes 34''', 34a, 34b illustrated in FIG. 5 upon encountering them, the roadmap nodes 34''' in between the first roadmap node 34a and the last roadmap node 34b are not deleted. The robotic cleaning device 10 may thus revert back to those intermediate roadmap nodes 34''' in case a shortcut link 36 needs to be added later on to a roadmap node 34 of another sequence section 42, 44, as shown and described referring to FIG. 4.

In case the robotic cleaning device 10 detects (not shown in the figures) an obstacle in between a currently registered roadmap node of the second sequence section and the previously registered roadmap node 34" of the first sequence section, the robotic cleaning 10 will navigate around it using the contact detecting portion 32 and optionally the obstacle detecting device, while registering S01 and linking S02 roadmap nodes until previously registered roadmap nodes 34" suitable for adding S03 shortcut links 40 are again encountered.

For the sake of simplicity the robotic cleaning device 10 is not shown in FIG. 5. However its current position would be at the current registered roadmap node 34.

Further, it should be mentioned that the roadmap graph 38' as schematically illustrated in FIG. 5 may for instance be established while the robotic cleaning device 10 was following a wall or the like.

Referring now to FIG. 6, which illustrates a roadmap graph 38 of a surface to be cleaned after completion of the cleaning and thus after the roadmap nodes 34 have been registered. The roadmap nodes 34, 34', 34", 34''', 34'''', 34a, 34b, the roadmap links 36 and the shortcut links 40 are illustrated, said roadmap nodes 34, 34', 34", 34''', 34'''', 34a, 34b, the roadmap links 36 and the shortcut links 40 forming a complete and robust roadmap graph 38. The roadmap graph 38 comprises the positional information about two obstacles 48, 50 thus teaching the robotic cleaning device 10 that it cannot drive in these areas. The starting point S of the cleaning and registering of roadmap nodes 34 and the current position C of the robotic cleaning device 10 are also visible in FIG. 6. FIG. 6 illustrates well how the robotic cleaning device 10 and the processing unit 16, respectively, add shortcut links 40 whenever previously registered roadmap nodes 34" of a an earlier sequence section 42 are encountered.

For illustrated purposes potential straight shortcuts 46, 46', 46" as shown in FIG. 5, are not shown in FIG. 6 although they may be present.

FIG. 7 illustrates schematically how the roadmap graph 38 of FIG. 6 may be used to determine S05 a shortest distance from a first position A to a second position B. The shortest distance from positions A to B may be determined by identifying a registered roadmap node 34"" close to the first position A and another registered roadmap node close 34"" close to the second position and by then calculating a transportation sequence 52. The transportation sequence 52 may be chosen as the sequence comprising the smallest amount of linked registered roadmap nodes 34, 34"", 34""" that lead from the first position A to the second position B. Linked registered roadmap nodes 34, 34"", 34""" is herewith to be understood as registered roadmap nodes 34, 34"", 34""" being linked by roadmap links 36, shortcut links 40 and/or straight shortcut links 46 (not shown in FIG. 7).

Determining S05 a shortest distance between a first position A and a second position B by identifying a registered roadmap node 34"" in proximity to the first position A and another registered roadmap node 34""" in proximity to the second position B and then calculating a transportation sequence 52 may alternatively involve the calculation of a transportation sequence (not shown), which comprises the shortest total distance, when summarizing the geometrical length of all roadmap links 36 and shortcut links 40 involved in the transportation sequence. In some cases, for example when many roadmap nodes are involved, this may lead to a shorter transportation sequence 52 than the calculation of the smallest amount of linked roadmap nodes 34, 34"", 34""" that lead from the first position A to the second position B.

FIGS. 6 and 7 further illustrate another sequence 54' of roadmap nodes 34, 34', 34"", 34""" linked by roadmap links 36. This sequence 54' is illustrated as being continuous this is however not necessarily the case, as previously mentioned.

The sequence 54' further comprises a plurality of sequence sections 42, 43, 44 as previously described.

The robotic cleaning device 10 is thus capable to navigate safely and with a small risk of getting lost. Additionally, even if a new obstacle is added to the cleaning environment in between a first cleaning session of a room or surface and a second cleaning session of the same room or surface, the robotic cleaning device 10 will be able to navigate safely since the registered roadmap nodes 34a, 34b, 34', 34", 34"', 34"", 34""", the roadmap links 36, the shortcut links 40 and the straight shortcut links 46, 46', 46" are deleted after each completed cleaning session. The roadmap graph 38 is thus always up to date and experience based leaving the robotic cleaning device 10 with a reliable and robust method for navigation.

The roadmap nodes 34a, 34b, 34', 34", 34"', 34"", 34""" may comprise positional information and additional information about the status of the robotic cleaning device 10 at the time of registering the roadmap node 34a, 34b, 34', 34", 34"', 34"", 34""" and/or the roadmap link 36. The additional information may for example be used to determine an arbitrary sequence of roadmap nodes that reduce the risk for collision with an obstacle.

In other words if the robotic cleaning device 10 for example detects that is regularly cross an edge of a carpet, the processing unit 16 may be configured to plan the cleaning and in particular a potential transportation sequence 52 accordingly to avoid that the carpet edge needs to be crossed if possible. Thus the registered roadmap nodes 34a, 34b, 34', 34", 34"', 34"", 34""" may provide the robotic cleaning device 10 and the processing unit 16, respectively, with additional information about the surface to be cleaned.

Further the additional information may comprise a tag such as "bumpy" which means that a certain area of the surface was bumpy or difficult to drive on, which will teach the robotic cleaning device 10 and the processing unit 16, respectively, to avoid this area when planning a sequence in order to make this sequence safer and more robust.

The time or distance intervals as previously described may not be regular or continuous they may vary depending on the amount of direction changes of the robotic cleaning device 10 during a specific time period. These direction changes may be easily detected by the dead reckoning sensor 30, 30'.

Figure 8:
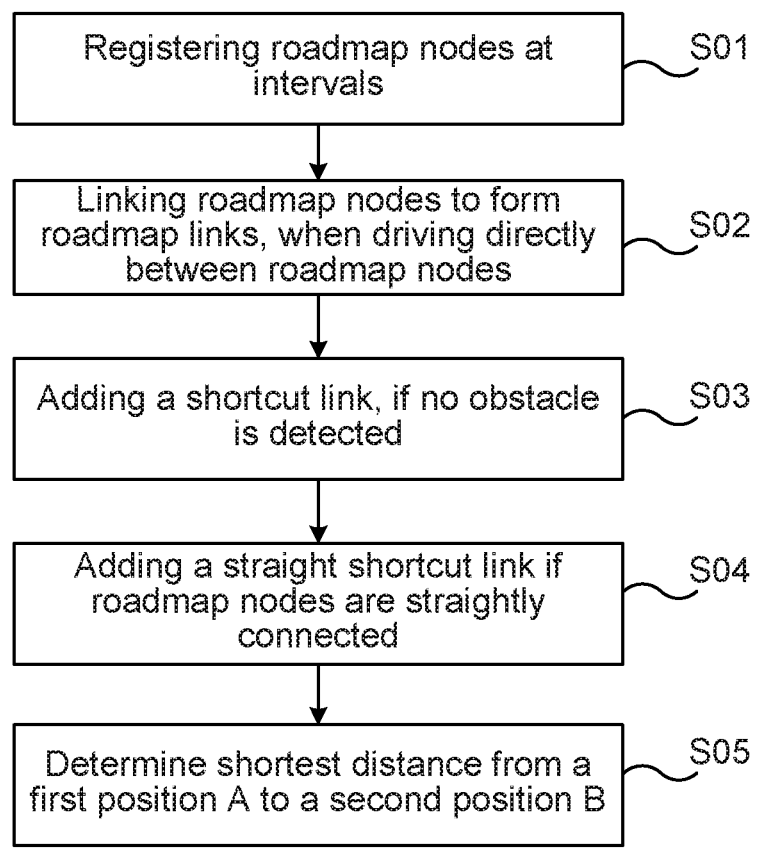
FIG. 8 schematically illustrates the steps of the method according to the invention.

FIG. 8 illustrates the steps according to the present invention. If an obstacle is detected (not shown), for instance when trying to add shortcut links 40, the robotic cleaning device 10 will not add a shortcut link 40 and go back to the first step and registering S01 and linking S02 roadmap nodes 34 while following the edge of the obstacle until previously registered roadmap nodes of a previous sequence section are again encountered.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of operating a robotic cleaning device over a surface to be cleaned, the method comprising:
   autonomously driving over the surface and cleaning the surface, by the robotic cleaning device;
   during the autonomous driving, autonomously registering, by the robotic cleaning device, a plurality of roadmap nodes at intervals on the surface, each of the plurality of roadmap nodes comprising respective positional information;
   in response to autonomously driving directly from a previously registered roadmap node of the plurality of roadmap nodes to a currently registered roadmap node of the plurality of roadmap nodes, autonomously generating a roadmap link between the previously registered roadmap node and the currently registered roadmap node;
   compiling the plurality of roadmap nodes and a plurality of roadmap links into a roadmap graph; and
   using the roadmap graph to navigate the robotic cleaning device during a subsequent cleaning.

2. The method according to claim 1, further comprising adding a shortcut link between a registered roadmap node of a first sequence section of registered roadmap nodes and a currently registered roadmap node of a second sequence section of registered roadmap nodes, if no obstacle is detected in between the registered roadmap node of the first sequence section and the currently registered roadmap node of the second sequence section, the second sequence section being arranged at an offset from the first sequence section.

3. The method according to claim 2, wherein the offset is smaller than a dimensional size of the robotic cleaning device, the dimensional size being a length or a width of the robotic cleaning device.

4. The method according to claim 2, wherein the first sequence section and the second sequence section each comprises at least two roadmap nodes linked by a respective roadmap link.

5. The method according to claim 1, further comprising determining a shortest distance between a first position and a second position by identifying a first registered roadmap node in proximity to the first position and a second registered roadmap node in proximity to the second position and calculating a transportation sequence comprising a smallest number of linked registered roadmap nodes that lead from the first position to the second position.

6. The method according to claim 1, further comprising determining a shortest distance between a first position and a second position by identifying a first registered roadmap node in proximity to the first position and a second registered roadmap node in proximity to the second position and calculating a transportation sequence comprising a shortest total distance from the first position to the second position, as measured by the sum of the geometrical length of all roadmap links and shortcut links involved in the transportation sequence.

7. The method according to claim 1, wherein the intervals comprise time intervals.

8. The method according to claim 1, wherein the intervals comprise distance intervals.

9. The method according to claim 1, further comprising increasing a frequency of the intervals when the robotic cleaning device changes its direction of movement more frequently than a predefined upper threshold frequency value.

10. The method according to claim 1, further comprising reducing a frequency of the intervals when the robotic cleaning device changes its direction of movement less frequently than a predefined lower threshold frequency value.

11. The method according to claim 1, further comprising adding straight shortcut links between a plurality of linked roadmap nodes forming a straight sequence segment by connecting a first one of the plurality of linked roadmap nodes and a last one of the plurality of roadmap nodes.

12. The method according to claim 1, wherein the roadmap nodes comprise additional information about the status of the robotic cleaning device at the time of registering the roadmap node.

13. The method according to claim 11, wherein the additional information is used to select among multiple possible sequences of roadmap nodes between the registering or roadmap nodes, an arbitrary sequence of roadmap nodes that reduce the risk for collision with an obstacle.

14. A robotic cleaning device comprising:
a main body;
a propulsion system arranged to move the robotic cleaning device;
a contact detecting portion connected to the main body and arranged to detect if the robotic cleaning device is in contact with an object;
a dead reckoning sensor operatively connected to the propulsion system;
a processing unit arranged to control the propulsion system;
wherein the processing unit is connected to the dead reckoning sensor and configured to:
autonomously drive the robotic cleaning device over a surface and clean the surface;
during the autonomous driving, autonomously register a plurality of roadmap nodes at intervals on the surface during cleaning, each of the plurality of roadmap nodes comprising respective positional information;
in response to autonomously driving directly from a previously registered roadmap node of the plurality of roadmap nodes to a currently registered roadmap node of the plurality of roadmap nodes, autonomously generate a roadmap link between the previously registered roadmap node and the currently registered roadmap node;
compile the plurality of roadmap nodes and a plurality of roadmap links into a roadmap graph; and
use the roadmap graph to navigate the robotic cleaning device during a subsequent cleaning.

15. A computer program comprising computer-executable instructions stored in a non-transitory medium for causing a robotic cleaning device to:
autonomously drive the robotic cleaning device over a surface and clean the surface;
during the autonomous driving, autonomously register a plurality of roadmap nodes at intervals on a surface as the robotic cleaning device traverses the surface, each of the plurality of roadmap nodes comprising respective positional information;
in response to autonomously driving directly from a previously registered roadmap node of the plurality of roadmap nodes to a currently registered roadmap node of the plurality of roadmap nodes, autonomously generate a roadmap link between the previously registered roadmap node and the currently registered roadmap node;
compile the plurality of roadmap nodes and a plurality of roadmap links into a roadmap graph; and
use the roadmap graph to navigate the robotic cleaning device during a subsequent cleaning.

16. The computer program of claim 15, wherein the computer executable instructions are executed on a processing unit in the robotic cleaning device.

* * * * *